United States Patent
Zhu

(10) Patent No.: US 8,923,248 B2
(45) Date of Patent: Dec. 30, 2014

(54) MOBILE TERMINAL AND HANDOFF METHOD THEREFOR

(71) Applicant: Samsung Electronics Co., Ltd., Gyeonggi-do (KR)

(72) Inventor: Jonghwan Zhu, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 96 days.

(21) Appl. No.: 13/646,153

(22) Filed: Oct. 5, 2012

(65) Prior Publication Data

US 2013/0089073 A1  Apr. 11, 2013

(30) Foreign Application Priority Data

Oct. 5, 2011  (KR) .................. 10-2011-0101052

(51) Int. Cl.
*H04W 36/00* (2009.01)
*H04W 88/06* (2009.01)

(52) U.S. Cl.
CPC .......... *H04W 36/0022* (2013.01); *H04W 88/06* (2013.01); *Y02B 60/50* (2013.01)
USPC .......................................... 370/331; 455/436

(58) Field of Classification Search
USPC ................... 370/328–331; 455/436–438, 440
See application file for complete search history.

(56) References Cited

U.S. PATENT DOCUMENTS

2006/0094430 A1* 5/2006 Shah ............................. 455/436
2006/0251021 A1* 11/2006 Nakano et al. ................ 370/331
2010/0309847 A1* 12/2010 Bharadwaj .................... 370/328

OTHER PUBLICATIONS

3GPP TS 23.237 v10.0.0, "IP Multimedia Subsystem (IMS) Service Continuity" Stage 2, Release 10, Dec. 15, 2009.*

* cited by examiner

*Primary Examiner* — Kerri Rose
(74) *Attorney, Agent, or Firm* — The Farrell Law Firm, P.C.

(57) ABSTRACT

A mobile terminal and handoff method are provided herein. The handoff method for a mobile terminal includes: obtaining a Basic Service Set (BSS) IDentifier (ID) of an Access Point (AP) during a Wireless Local Area Network (WLAN) mode in which communication is performed through a Wi-Fi network; determining whether the obtained BSS ID is assigned to an edge AP near to a mobile communication network; and performing a handoff to the mobile communication network, when the obtained BSS ID is assigned to the edge AP.

10 Claims, 5 Drawing Sheets

MOBILE TERMINAL AND HANDOFF METHOD THEREFOR

PRIORITY

This application claims priority under 35 U.S.C. §119(a) to Korean Patent Application No. 10-2011-0101052, which was filed in the Korean Intellectual Property Office on Oct. 5, 2011, the entire disclosure of which is incorporated herein by reference.

BACKGROUND OF THE INVENTION

1. Field of the Invention

The present invention relates generally to a handoff method for a mobile terminal and, more particularly, to a method and apparatus for performing handoff between Wi-Fi and $3^{rd}$ Generation (3G) mobile networks, without interrupting ongoing communication.

2. Description of the Related Art

Voice Call Continuity (VCC) provides seamless call services between Wi-Fi and 3G mobile networks. When using VCC technology to provide a seamless call service, the signal strength of a Wi-Fi network is measured during a call and, when the signal strength is weak, call connection is reconfigured using a 3G mobile network. Therefore, it is important to identify a handoff occurrence time in VCC technology.

To identify a handoff occurrence time, a mobile terminal may estimate the probability of a handoff occurrence by periodically measuring network signal power. However, this estimation usually involves a large margin of error due to discrepancies between the measurement cycle and user movement between networks.

In addition, repeated measurements of network signal power increases power consumption in the mobile terminal, where power saving operation is critical.

Additionally, fast user movement between networks often makes it difficult to accurately identify a handoff occurrence time.

SUMMARY OF THE INVENTION

Accordingly, the present invention has been made to address the above-described problems and to provide at least the advantages described below.

An aspect of the present invention is to provide a method and apparatus for performing a handoff between heterogeneous networks.

In accordance with an aspect of the present invention, a handoff method for a mobile terminal is provided. The method includes obtaining a Basic Service Set (BSS) IDentifier (ID) of an Access Point (AP) during a Wireless Local Area Network (WLAN) mode in which communication is performed through a Wi-Fi network; determining whether the obtained BSS ID is assigned to an edge AP near to a mobile communication network; and performing a handoff to the mobile communication network, when the obtained BSS ID is assigned to the edge AP.

In accordance with another aspect of the present invention, a mobile terminal supporting a handoff is provided. The mobile terminal includes a communication unit that sends and receives data to and from heterogeneous networks; and a control unit that obtains a Basic Service Set (BSS) IDentifier (ID) of an Access Point (AP) during a Wireless Local Area Network (WLAN) mode where communication is performed through a Wi-Fi network, determines whether the obtained BSS ID is assigned to an edge AP near to a mobile communication network, and controls the communication unit to perform the handoff to the mobile communication network, when the obtained BSS ID is assigned to the edge AP.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE INVENTION

Hereinafter, various embodiments of the present invention are described in detail with reference to the accompanying drawings. Detailed descriptions of well-known functions and structures incorporated herein may be omitted to avoid obscuring the subject matter of the present invention. Further, particular terms may be defined to describe the present invention in the best manner. Accordingly, the meaning of specific terms or words used in the specification and the claims should not be limited to the literal or commonly employed sense, but should be construed in accordance with the spirit of the present invention.

Although a Wi-Fi network is used a representative Wireless Local Area Network (WLAN), and a 3G mobile communication network is used as a representative mobile communication network supporting mobility in the description below, the present invention is not limited to this specific WLAN and mobile communication network combination.

Figure 1:
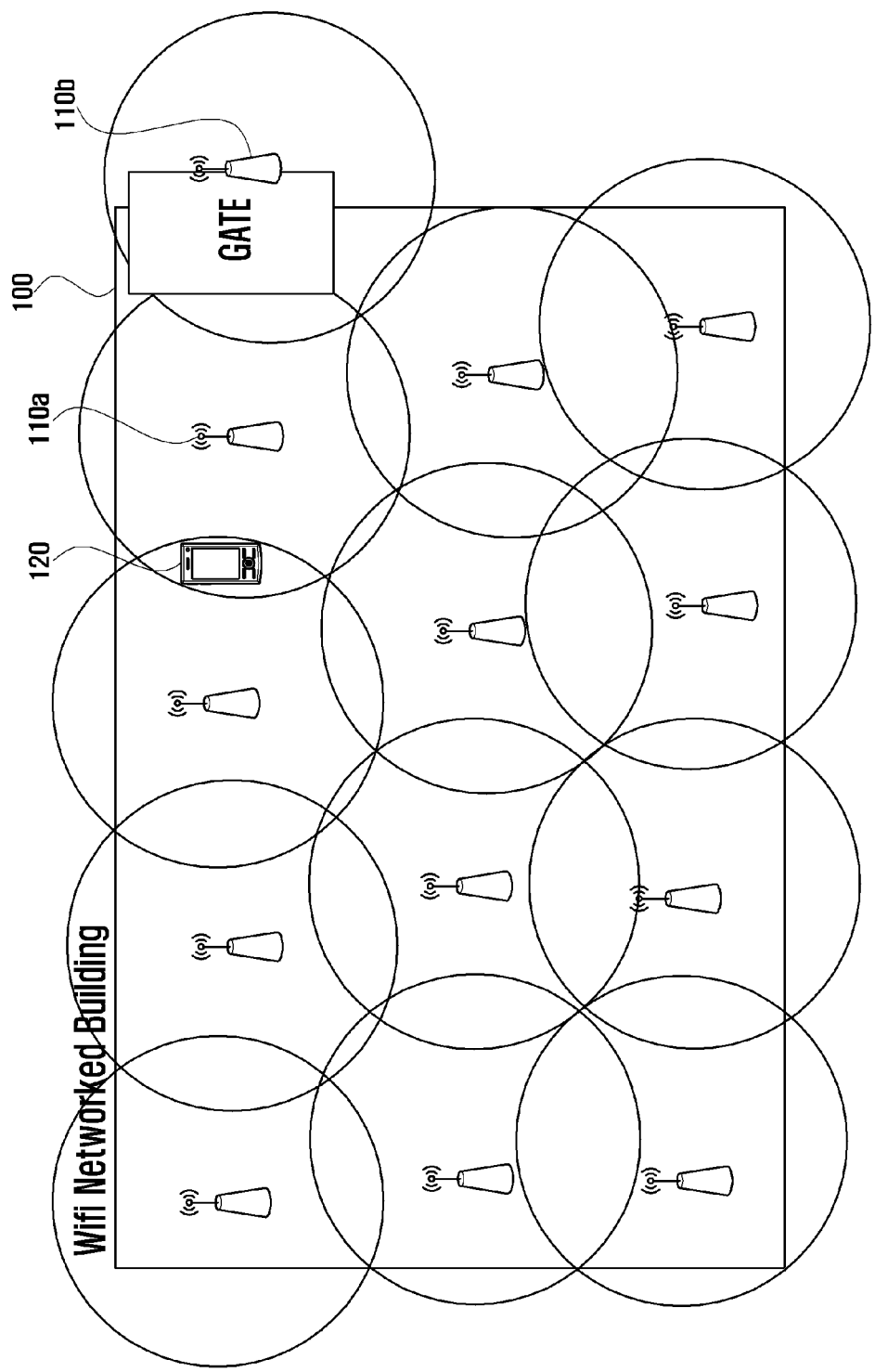
FIG. 1 illustrates a mobile communication system according to an embodiment of the present invention.

FIG. 1 illustrates a mobile communication system according to an embodiment of the present invention.

Referring to FIG. 1, the mobile communication system includes multiple Access Points (APs) 110 and a mobile terminal 120. Although not illustrated, the mobile communication system further includes an Access Point Controller (APC) for controlling an AP, an Internet Protocol Private Branch Exchange (IP PBX) for controlling call connection and handoff for the mobile terminal 120, and a Voice Call Continuity (VCC) server.

An AP is a small base station in a WLAN, and acts as a master to control stations or devices within a Basic Service Set (BSS). That is, the AP performs functions related to synchronization, power control, and medium access control for mobile terminals within a BSS. APs within an Extended Service Set (ESS), including multiple connected BSSs, act as bridges for BSSs to allow for roaming between APs.

The IP PBX is a telephone exchange operating on an Internet Protocol (IP) network and interworks with a Public Switched Telephone Network (PSTN). The IP PBX transmits voice and video data through an IP network, allowing an office phone or a mobile terminal to place a phone call. The VCC server supports continuity of a communication service using VCC technology when a mobile terminal moves between Wi-Fi and 3G mobile networks. When a handoff is performed between the Wi-Fi and 3G mobile networks, a mobile terminal communicates with the VCC server for connection reestablishment through the IP PBX.

Referring to FIG. 1, within a building, communication is performed via the APs. The building is within the coverage of a 3G mobile network. Within the building, handoff to the 3G mobile network is possible at a given gate, and roaming between APs is achieved by a handoff occurring at places except for the gate.

APs are arranged to cover all of the regions within the building, and to communicate with an APC to provide roaming information for the mobile terminal 120 to move around in the building.

Specifically, in FIG. 1, a first AP 110a is within the building, and a second AP 110b is placed close to the gate at which handoff to the 3G mobile network is possible. The mobile terminal 120 is associated with the first AP 110a and receives data through the Wi-Fi network. The mobile terminal 120 communicates with the IP PBX to place a call or office line call. When a VCC handoff occurs, the mobile terminal 120 communicates with the VCC server and the IP PBX reestablishes the call as a 3G call. When the mobile terminal 120 moves to an edge AP near the 3G mobile network, the probability of a handoff increases.

The coverage of a single AP is limited. Further, when the mobile terminal 120 moves fast, the time during which the mobile terminal 120 remains in the AP coverage is short. Here, in terms of power consumption, it is often advantageous for the mobile terminal 120 to be directly handed off to the 3G mobile network, rather than being associated with the edge AP.

When the mobile terminal 120 is moved by the user to the coverage of the second AP 110b, it requests the second AP 110b to send a BSS IDentifier (ID) thereof. The mobile terminal 120 sends the BSS ID of the second AP 110b to the VCC server to determine whether the second AP 110b is an edge AP near to the 3G mobile network. Alternatively, when edge APs are configured to have BSS IDs (MAC addresses) in a given range, the mobile terminal 120 determines whether the second AP 110b is an edge AP merely by checking whether received BSS ID belongs to the range allocated to the edge APs.

In FIG. 1, the second AP 110b is placed at the gate where the probability of handoff to 3G mobile network is high. Thus, the mobile terminal 120 determines whether the second AP 110b is an edge AP. Thereafter, the mobile terminal 120 directly performs a handoff to the 3G mobile network or determines whether to perform handoff by checking whether received signal strength remains above a threshold level for a preset time.

In the description above, when a mobile terminal roams to an edge AP, it attempts to directly perform a handoff to a 3G mobile network or to roam to another AP based on signal strength measurement.

A mobile terminal may determine whether an AP is an edge AP based on a response received from the VCC server. To achieve this, the VCC server pre-stores BSS ID information of edge APs and sends a response including an edge AP indication to the mobile terminal using a Transmission Control Protocol (TCP)/IP protocol suite.

Multiple edge APs are present in a realistic environment. When the number of edge APs is not large, the VCC server may store a table containing BSS IDs of edge APs. In this case, the VCC server compares a BSS ID received from a mobile terminal with the table. When an AP corresponding to the received BSS ID is present in the table, the VCC server sends a response including an edge AP indication to the mobile terminal.

When the number of edge APs is larger, the VCC server may store a threshold BSS ID (e.g., MAC address) that divides all BSS IDs into BSS IDs assigned to edge APs and BSS IDs assigned to non-edge APs. BSS IDs may be represented in a hexadecimal form of AA:BB:CC:DD:EE:FF. Assuming that the left most position is the most significant, BSS IDs may be sorted in sequence.

For example, when there are 500 APs and 30 edge APs among 500 APs in a Wi-Fi network, the top thirty BSS IDs are assigned to edge APs, and the thirtieth BSS ID (threshold BSS ID) is 12:34:56:AB:CD:EF, the VCC server compares a BSS ID received from a mobile terminal with the thirtieth BSS ID. When the received BSS ID is less than the thirtieth BSS ID, the VCC server determines that an AP corresponding to the received BSS ID is not an edge AP. However, when an AP corresponding to a received BSS ID is an edge AP, the VCC server sends a response including an edge AP indication to the mobile terminal.

To determine whether an AP is an edge AP, the mobile terminal may pre-store edge AP ID information received from the VCC server and compare an obtained BSS ID with the edge AP ID information. Specifically, the mobile terminal receives edge AP ID information from the VCC server or the IP PBX at an initial service connection (for example, at the time of Voice over Internet Protocol (VoIP) Session Initiation Protocol (SIP) registration) and store the received edge AP ID information in advance. Thereafter, whenever roaming occurs, the mobile terminal determines whether an AP is an edge AP, based on the pre-stored edge AP ID information. For example, the edge AP ID information may include a table of BSS IDs of edge APs or a threshold BSS ID.

Figure 2:
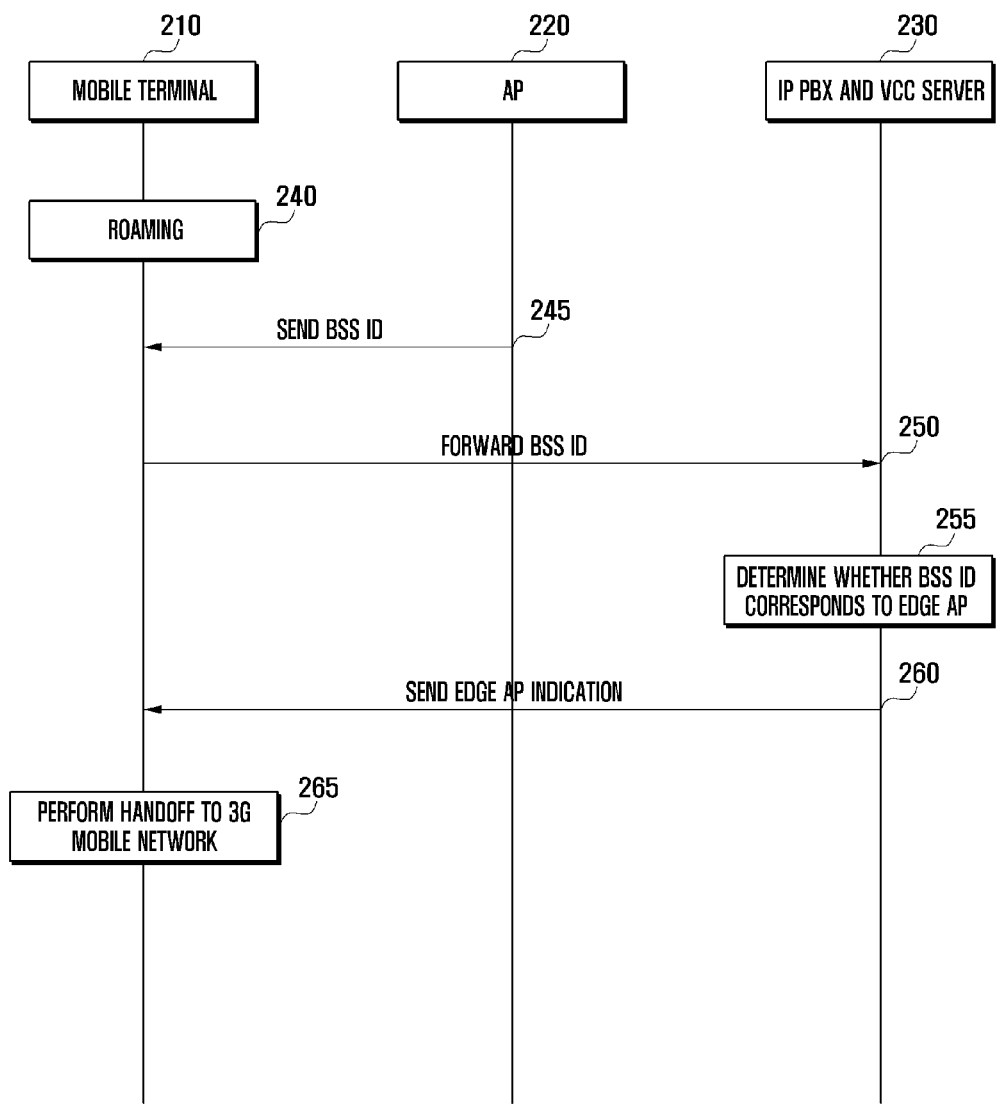
FIG. 2 is a signal flow diagram illustrating a method for performing a handoff according to an embodiment of the present invention.

FIG. 2 is a signal flow diagram illustrating a method for performing a handoff according to an embodiment of the present invention.

Referring to FIG. 2, a mobile communication system includes a mobile terminal 210, an AP 220, an IP PBX and a VCC server 230, wherein the IP PBX and VCC server 230 determines whether the AP 220 is an edge AP and notifies the determination result to the mobile terminal 210.

More specifically, the mobile terminal 210 sends and receives data to and from a Wi-Fi network, while roaming in step 240. In step 245, the AP 220 sends a BSS ID thereof to the mobile terminal 210. In step 250, the mobile terminal 210 sends the received BSS ID to the IP PBX and VCC server 230.

In step 255, the IP PBX and VCC server 230 compares the received BSS ID with pre-stored edge AP ID information to determine whether the AP 220 corresponding to the received BSS ID is an edge AP. For example, the edge AP ID information includes a table of BSS IDs assigned to edge APs or a threshold BSS ID that divides all BSS IDs into BSS IDs assigned to edge APs and BSS IDs assigned to non-edge APs.

When the AP corresponding to the received BSS ID is an edge AP, the IP PBX and VCC server 230 notifies this to the mobile terminal 210 in step 260. Upon receiving the notification, the mobile terminal 210 performs a handoff to a 3G mobile network with the help of the VCC server 230 in step 265.

Figure 3:
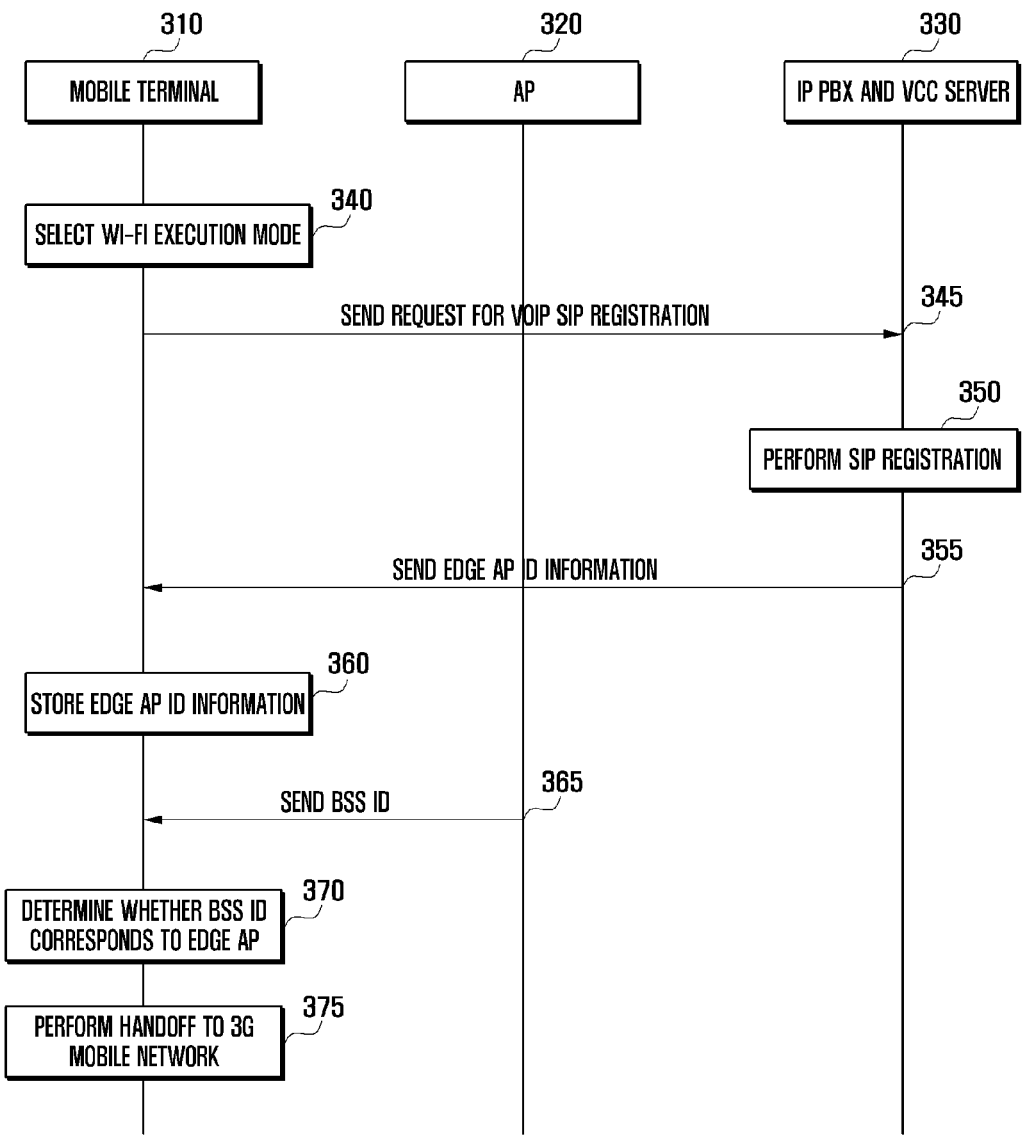
FIG. 3 is a signal flow diagram illustrating a method for performing a handoff according to an embodiment of the present invention.

FIG. 3 is a signal flow diagram illustrating a method for performing a handoff according to an embodiment of the present invention.

Referring to FIG. 3, a mobile communication system includes a mobile terminal 310, an AP 320, an IP PBX and a VCC server 330, wherein the mobile terminal 310 determines whether the AP 320 is an edge AP.

More specifically, when Wi-Fi execution mode is selected in step 340, the mobile terminal 310 sends a request for VoIP SIP registration to the IP PBX and VCC server 330 in step 345. Here, VoIP is a communication technology for Internet telephony and supports voice calls using packet data on IP networks. SIP is a text-based application layer protocol to create, modify, and terminate sessions involving participants. For example, SIP sessions are related to remote conferencing, telephony, event notification, and instant messaging on the Internet. SIP is based on a client-server model where a client makes a request and a server responds to the request, and conforms to text-based Internet standards to thereby facilitate troubleshooting and debugging.

The IP PBX and VCC server 330 perform SIP registration in step 350, and sends preset edge AP ID information to the mobile terminal 310 in step 355. For example, the edge AP ID information includes a table of BSS IDs assigned to edge APs or a threshold BSS ID that divides all BSS IDs into BSS IDs assigned to edge APs and BSS IDs assigned to non-edge APs.

In step 360, the mobile terminal 310 stores the received edge AP ID information. In step 365, the mobile terminal 310 sends an ID request for association to the AP 320, and the AP 320 sends a BSS ID thereof to the mobile terminal 310. In step 370, the mobile terminal 310 compares the received BSS ID with the stored edge AP ID information to determine whether the AP 320 corresponding to the received BSS ID is an edge AP. When the AP 320 corresponding to the received BSS ID is an edge AP, the mobile terminal 310 terminates association with the corresponding AP and performs a handoff to the 3G mobile network in step 375.

Figure 4:
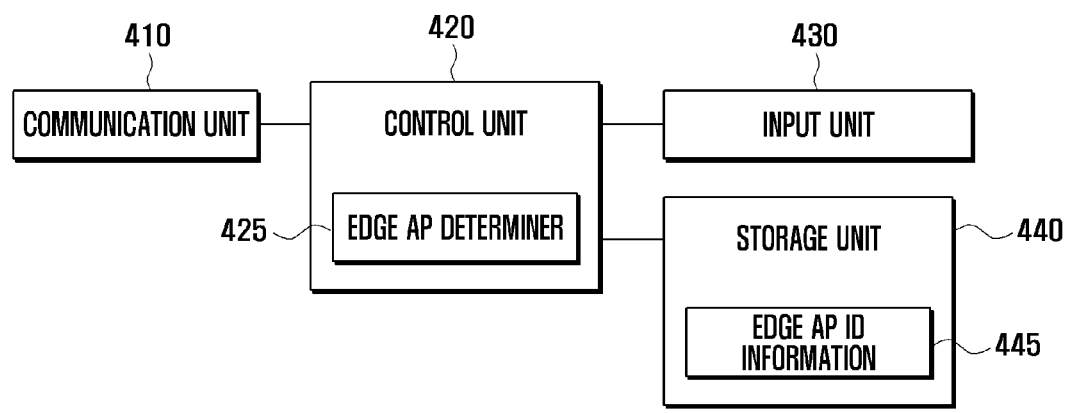
FIG. 4 is a block diagram illustrating a mobile terminal according to an embodiment of the present invention.

FIG. 4 is a block diagram illustrating a mobile terminal according to an embodiment of the present invention.

Referring to FIG. 4, the mobile terminal includes a communication unit 410, a control unit 420, an input unit 430, and a storage unit 440. The communication unit 410 communicates with a communication network. More specifically, the communication unit 410 sends and receives data through a mobile communication network or a Wi-Fi network and may include different transceiver modules or a composite transceiver module to communicate with different networks.

For a handoff under the control of the control unit 420, the communication unit 410 receives a BSS ID from an AP, and receives edge AP ID information or a response having an edge AP indication from the VCC server.

The control unit 420 controls overall operations and states of individual components in the mobile terminal. When a WLAN mode is selected for communication using a Wi-Fi network, the control unit 420 controls the communication unit 410 to measure strengths of signals from nearby APs and determines whether an AP capable of providing a desired service is present. When such an AP is present, the control unit 420 associates with the AP to exchange data. The control unit 420 measures a strength of a signal received through the communication unit 410 from the associated AP at regular intervals, and checks whether the received signal strength is below a preset threshold to determine whether to perform roaming.

When the mobile terminal roams to a new AP, the control unit 420 obtains a BSS ID of the new AP and determines whether the new AP is an edge AP near to the 3G mobile network. When the new AP is an edge AP, the control unit 420 controls the communication unit 410 to immediately perform a handoff to the 3G mobile network. To achieve this, the control unit 420 includes an edge AP determiner 425.

The edge AP determiner 425 determines whether the obtained BSS ID is a BSS ID assigned to an edge AP to support a direct handoff to the 3G mobile network.

Whether an obtained BSS ID is a BSS ID assigned to an edge AP may be determined in the following two ways.

I. The VCC server determines whether a specific BSS ID is a BSS ID assigned to an edge AP. That is, the edge AP determiner 425 sends an obtained BSS ID through the communication unit 410 to the VCC server. The VCC server determines whether the received BSS ID is a BSS ID assigned to an edge AP, based on the pre-stored edge AP ID information. When the received BSS ID is a BSS ID assigned to an edge AP, the VCC server sends a response containing edge AP indication to the mobile terminal.

II. The mobile terminal determines whether a specific BSS ID is a BSS ID assigned to an edge AP, based on edge AP ID information received from the VCC server. That is, the edge AP determiner 425 compares a BSS ID received while roaming with edge AP ID information stored in the storage unit 440 to determine whether the received BSS ID is a BSS ID assigned to an edge AP. For example, the edge AP ID information includes a table of BSS IDs assigned to edge APs or a threshold BSS ID that divides all BSS IDs into BSS IDs assigned to edge APs and BSS IDs assigned to non-edge APs.

When the obtained BSS ID is a BSS ID assigned to an edge AP, the control unit 420 checks whether a call is in progress. When a call is in progress, the control unit 420 controls the communication unit 410 to perform handoff to the 3G mobile network through the VCC server to maintain the call in progress.

Alternatively, when the obtained BSS ID is assigned to an edge AP, the control unit 420 checks whether the received signal strength of the AP corresponding to the obtained BSS ID remains above a preset threshold for a preset time. When the received signal strength is below the preset threshold, the control unit 420 may check whether a call is in progress to make a handoff attempt.

The input unit 430 includes alphanumeric keys to enter alphanumeric information and function keys to set various functions. In particular, the input unit 430 generates an input signal for selecting the WLAN mode to communicate with Wi-Fi network and sends the input signal to the control unit 420.

The storage unit 440 stores application programs for various functions of the mobile terminal and stores data generated in the course of using the mobile terminal. In particular, the storage unit 440 stores edge AP ID information 445 received from the VCC server. For example, the edge AP ID information 445 includes a table of BSS IDs assigned to edge APs or a threshold BSS ID that divides all BSS IDs into BSS IDs assigned to edge APs and BSS IDs assigned to non-edge APs.

As described above, the mobile terminal illustrated in FIG. 4 may directly determine whether a specific AP is an edge AP. However, when the mobile terminal does not need to directly determine whether a specific AP is an edge AP, it is unnecessary to store edge AP ID information in the storage unit 440.

Additionally, the mobile terminal may include other components, such as a display unit for displaying data and operation states, a camera module for capturing images, and a digital broadcast receiver for receiving digital broadcasts.

Figure 5:
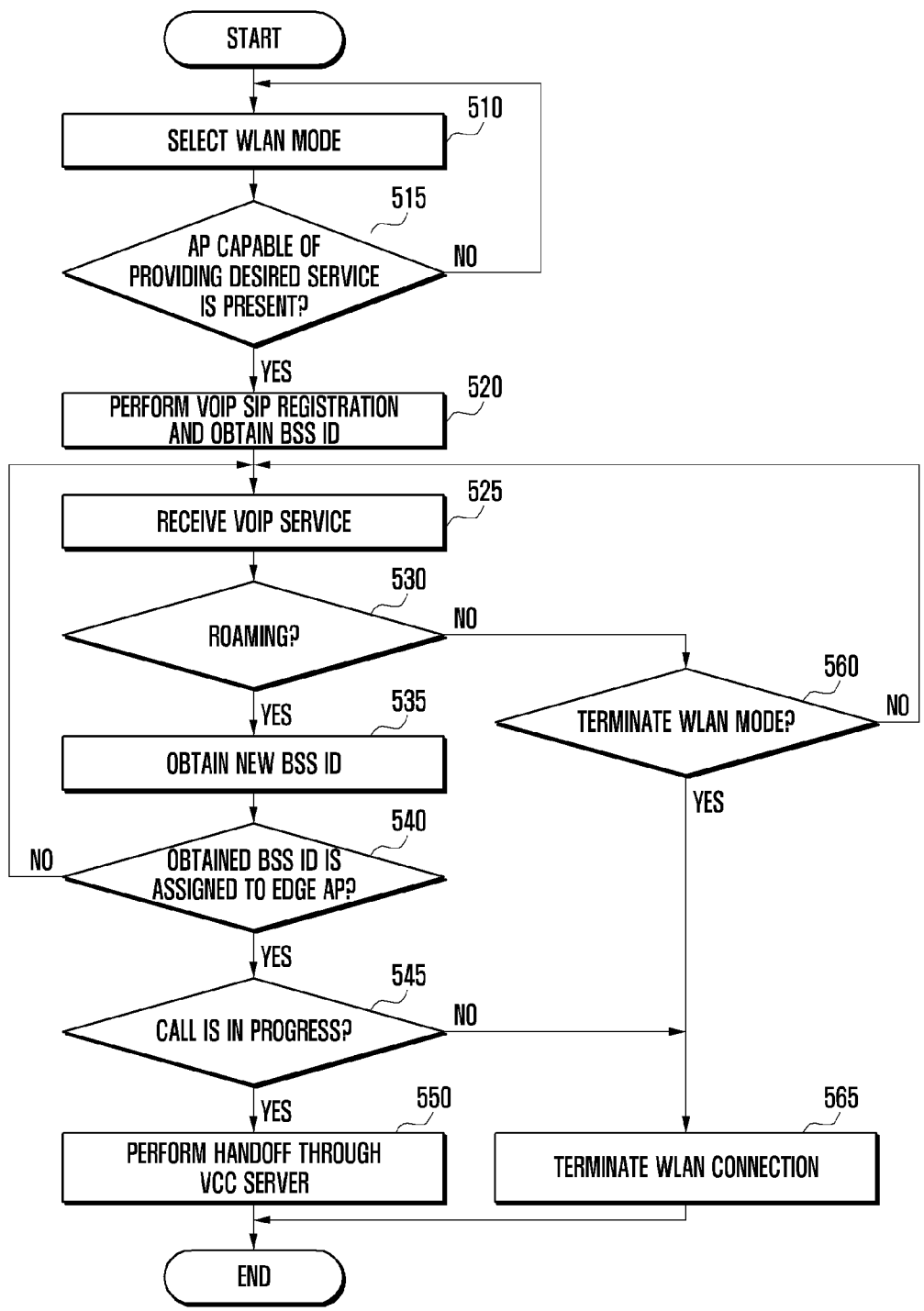
FIG. 5 is a flowchart illustrating a method of a mobile terminal for performing a handoff according to an embodiment of the present invention.

FIG. 5 is a flowchart illustrating a method for a mobile terminal to perform a handoff according to an embodiment of the present invention.

Referring to FIG. 5, in step 510, a WLAN mode is selected for communication using a Wi-Fi network, and in step 515, the mobile terminal determines whether an AP capable of providing a desired service is present. When such an AP is present, the mobile terminal performs VoIP SIP registration for communication and obtains a BSS ID of the AP capable of providing a desired service in step 520.

In step 525, the mobile terminal receives a desired VoIP service, and measures the received signal strength of the AP at regular intervals. In step 530, the mobile terminal determines whether to roam to a new AP in the vicinity thereof. For example, when the received signal strength of the current AP is below a preset threshold, the mobile terminal determines to roam to a new AP.

When roaming to a new AP, the mobile terminal obtains a BSS ID of the new AP in step 535. In step 540, the mobile terminal determines whether the obtained BSS ID is a BSS ID assigned to an edge AP.

As described above, the mobile terminal may receive a notification from the VCC server that a specific BSS ID is assigned to an edge AP, or may compare the obtained BSS ID with the pre-stored edge AP ID information to directly determine whether the obtained BSS ID is assigned to an edge AP.

When the obtained BSS ID is assigned to an edge AP, the mobile terminal checks whether a call is in progress in step 545. When a call is in progress, the mobile terminal performs handoff to the 3G mobile network through the VCC server to maintain the call in progress in step 550.

Although not illustrated in FIG. 5, when the obtained BSS ID is assigned to an edge AP in step 540, the mobile terminal may check whether the received signal strength of the AP corresponding to the obtained BSS ID remains above a preset threshold for a preset time. When the received signal strength is below the preset threshold, the mobile terminal may check whether a call is in progress to make a handoff attempt.

When the mobile terminal does not perform roaming in step 530, the mobile terminal checks whether a termination request for the WLAN mode is made in step 560. When a termination request for the WLAN mode is made, the mobile terminal terminates the WLAN connection in step 565.

Additionally, when no call is in progress in step 545, the mobile terminal terminates the WLAN connection in step 565.

In accordance with the above-described embodiments of the present invention, to perform a handoff between heterogeneous networks, e.g., a Wi-Fi network and a 3G mobile network, a mobile terminal identifies a handoff occurrence time in a flexible manner, thereby reducing power consumption.

Although certain embodiments of the present invention have been described in detail hereinabove, it should be understood that many variations and modifications of the basic inventive concept described herein will still fall within the spirit and scope of the present invention as defined in the appended claims and their equivalents.

What is claimed is:

1. A handoff method for a mobile terminal, the handoff method comprising:
    obtaining a Basic Service Set (BSS) IDentifier (ID) of an Access Point (AP) during a Wireless Local Area Network (WLAN) mode in which communication is performed through a Wi-Fi network;
    sending the obtained BSS ID to a Voice Call Continuity (VCC) server;
    receiving information including an edge AP indication indicating whether the obtained BSSID is assigned to the edge AP from the VCC server;
    determining whether the obtained BSS ID is assigned to an edge AP near to a mobile communication network based on the received information; and
    performing a handoff to the mobile communication network, based on determining whether the obtained BSS ID is assigned to the edge AP,
    wherein the edge AP indication is generated, at the server, by comparing, the received BSS ID with edge AP ID information.

2. The handoff method of claim 1, wherein the edge AP ID information includes one of a table of BSS IDs assigned to edge APs, and a threshold BSS ID that divides all BSS IDs into BSS IDs assigned to edge APs and BSS IDs assigned to non-edge APs.

3. The handoff method of claim 1, further comprising storing the information,
    wherein the information includes edge AP ID information, and
    wherein determining whether the obtained BSS ID is assigned to the edge AP comprises comparing the obtained BSS ID with in the edge AP ID information.

4. The handoff method of claim 3, wherein the edge AP ID information includes one of a table of BSS IDs assigned to edge APs, and a threshold BSS ID that divides all BSS IDs into BSS IDs assigned to edge APs and BSS IDs assigned to non-edge APs.

5. The handoff method of claim 1, wherein performing the handoff to the mobile communication network comprises:
    checking whether a call is in progress;
    conducting the handoff to the mobile communication network, when the call is in progress; and
    terminating the WLAN mode, when no call is in progress.

6. A mobile terminal supporting a handoff, the mobile terminal comprising:
    a communication unit that sends and receives information to and from heterogeneous networks; and
    a control unit that obtains a Basic Service Set (BSS) IDentifier (ID) of an Access Point (AP) during a Wireless Local Area Network (WLAN) mode where communication is performed through a Wi-Fi network, sends the obtained BSS ID to a Voice Call Continuity (VCC) server, receives information including an edge AP indication indicating whether the obtained BSSID is assigned to the edge AP from the VCC server, determines whether the obtained BSS ID is assigned to an edge AP near to a mobile communication network, based on the received information and performs the handoff to the mobile communication network, based on determining whether the obtained BSS ID is assigned to the edge AP,
    wherein the edge AP indication is generated, at the server, by comparing, the received BSS ID with edge AP ID information.

7. The mobile terminal of claim 6, further comprising a storage unit that stores the information, wherein the information includes edge AP ID information.

8. The mobile terminal of claim 7, wherein the edge AP ID information comprises one of:
    a table of BSS IDs assigned to edge APs; and
    a threshold BSS ID that divides all BSS IDs into BSS IDs assigned to edge APs and BSS IDs assigned to non-edge APs.

9. The mobile terminal of claim 8, wherein the control unit reads the edge AP ID information stored in the storage unit, and checks whether the obtained BSS ID is present in the edge AP ID information.

10. The mobile terminal of claim 6, wherein the control unit checks whether a call is in progress, conducting the handoff to the mobile communication network when the call is in progress, and terminates the WLAN mode when no call is in progress.

* * * * *